F. MINGUS.
VEHICLE WHEEL WRENCH.
APPLICATION FILED APR. 11, 1912.
1,049,897.
Patented Jan. 7, 1913.
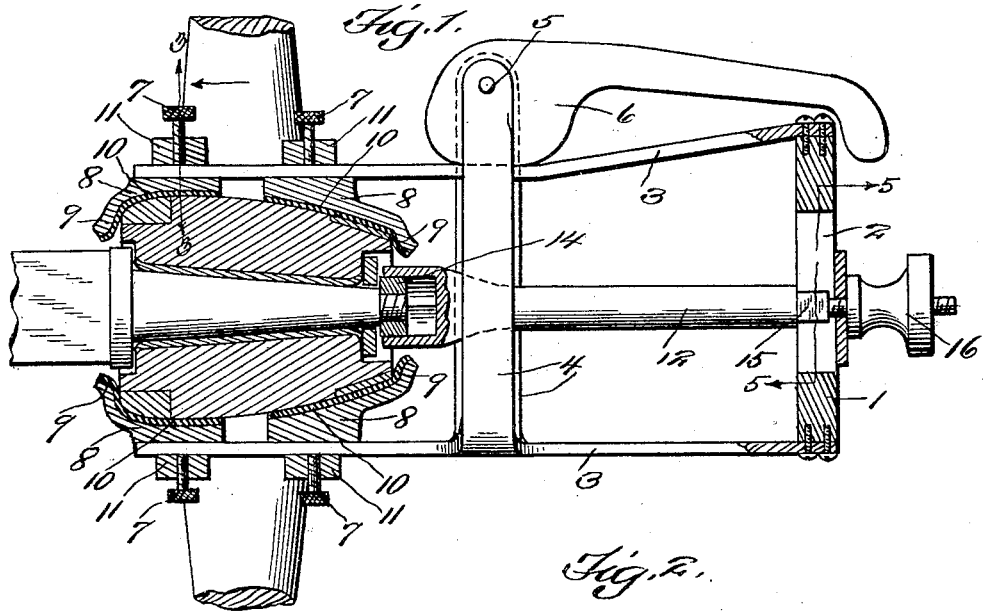
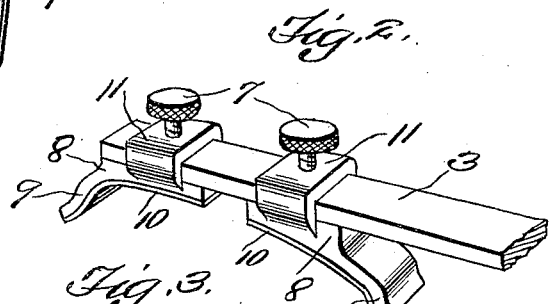
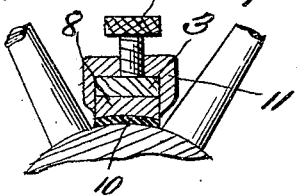
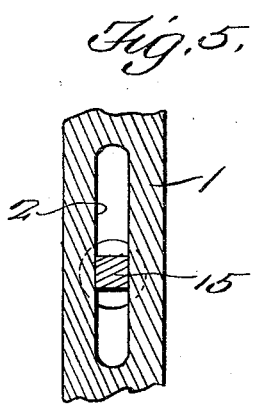
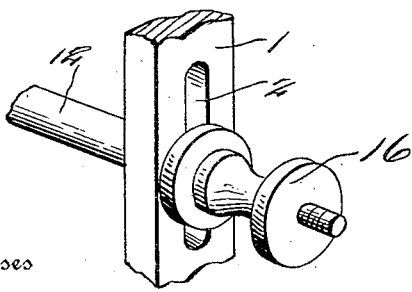
Witnesses
Inventor
Fred Mingus,
Attorneys

UNITED STATES PATENT OFFICE.

FRED MINGUS, OF ALMA CENTER, WISCONSIN.

VEHICLE WHEEL-WRENCH.

1,049,897.

Specification of Letters Patent.

Patented Jan. 7, 1913.

Application filed April 11, 1912. Serial No. 690,021.

*To all whom it may concern:*

Be it known that I, FRED MINGUS, a citizen of the United States, residing at Alma Center, in the county of Jackson and State of Wisconsin, have invented a new and useful Vehicle Wheel-Wrench; and I do hereby declare the following to be a full, clear, and exact description of the invention, such as will enable others skilled in the art to which it appertains to make and use the same.

This invention relates to a new and useful vehicle wheel wrench.

The invention aims as its principal object to provide a device of this design, for removing the nut and the wheel at the same time, and hold the nut in place with respect to the wheel, so that they may be easily replaced on the spindle of the axle.

The invention comprises further features and combination of parts, as hereinafter set forth, shown in the drawings and claimed.

In the drawings:—Figure 1 is a view showing the application of the vehicle wheel wrench, the same being constructed in accordance with the invention. Fig. 2 is a detail view of one of the spring arms, showing two of the clamping jaws thereon. Fig. 3 is a sectional view on line 3—3 of Fig. 1. Fig. 4 is a detail view of a portion of the plate 1, showing how the rod 12 is held adjustably in the slot or opening 2. Fig. 5 is a sectional view on line 5—5 of Fig. 1.

Referring to the drawings 1 designates a plate having an elongated opening 2. Secured to each end of the plate is a spring arm 3. Forming a part of one of the spring arms are two draw bars 4, between the free ends of which the other spring arm is movably arranged. Connecting the free ends of the draw bars is a pin 5, which constitutes a pivot for the cam lever 6. This cam lever 6 acts on one of the spring arms 3 when moved in the direction of said arms, to press the arms together. The cam lever is constructed, as shown in the drawings, to hold the spring arms pressed together. Adjustably fixed to the free ends of the spring arms 3, by means of the set screws 7 are jaw plates 8, the ends of which are bent as shown at 9 to engage each end of the hub of the wheel. The adjacent faces of the jaw plates between their bent ends 9 are provided with rubber linings 10, so as to assist in holding the vehicle wheel wrench in place.

The free ends of the spring arms pass between the straps 11 (through which the set screws 7 are threaded) and the jaw plates. The purpose of making the jaw plates adjustable with respect to the spring arms, is to permit the wrench to be fitted to wheel hubs of different sizes.

A rod 12 is provided, one end of which terminates in a box wrench, adapted to fit the nut 14 on the spindle, while the other end of the rod terminates in a reduced portion 15, on which the thumb nut 16 is threaded. The reduced portion 15 passes through the opening 2 of the plate 1, and the nut 16 constitutes means for holding the rod 12 in its proper relative position.

In removing a wheel and nut together, with the nut in its proper position with respect to the wheel, in order to allow the wheel and nut to be replaced, the jaw plates are arranged to engage the circumferential surface of the hub, with the box wrench in engagement with the nut. The cam lever is then operated to draw the spring arms together, so that the jaw plate will firmly grip the hub, with the bent ends 9 engaging each end of the hub. Being that the rod 12 is fixed to rotate or move with the plate 1 and the jaws as one body, the wheel is then rotated. In this manner the nut will unscrew from the spindle, and remain in its proper position with respect to the wheel hub, which is also removed simultaneously therewith.

The invention having been set forth, what is claimed as new and useful is:—

In combination, a plate having a box wrench arranged adjustably with relation thereto, the plate having spring arms adapted to extend between the spokes upon the opposite longitudinal sides of a wheel hub, and the box wrench to engage a nut on a spindle of an axle, clamping jaws having inturned ends to overhang both ends of said wheel hub, said jaws being arranged in pairs, one pair carried by each spring arm, the jaws of each pair having arched straps to receive the said spring arms, means threaded through said straps to engage the spring arms to hold the jaws adjustably upon said arms, whereby said jaws may be adjusted in order to grip both ends of various sizes of wheel hubs, the inturned ends of the jaws constituting means to prevent longitudinal movement of the jaws with relation to the wheel hub, and longitudinal displacement of the spring arms, connections between the spring arms and including a device for clamping the jaws against opposite longitudinal sides of said wheel hub.

In testimony whereof I have signed my name to this specification in the presence of two subscribing witnesses.

FRED MINGUS.

Witnesses:
 HARRY H. VAN GORDEN,
 LAWRENCE FABER.

Copies of this patent may be obtained for five cents each, by addressing the "Commissioner of Patents, Washington, D. C."